United States Patent [19]
Tuffli

[11] 3,739,523
[45] June 19, 1973

[54] PLANT HOLDER AND WATERING DEVICE FOR POTTED PLANTS

[76] Inventor: Jon Martin Tuffli, 17 Maple Avenue, Kentfield, Calif. 94904

[22] Filed: Aug. 5, 1971

[21] Appl. No.: 169,293

[52] U.S. Cl. .................................. 47/38.1, 47/47
[51] Int. Cl. ............................................ A01g 27/00
[58] Field of Search ................. 47/44, 47, 48.5, 47/38.1, 38

[56] References Cited
UNITED STATES PATENTS

| | | | |
|---|---|---|---|
| 2,150,605 | 3/1939 | Lester | 47/38 |
| 2,691,245 | 10/1954 | Yohe | 47/38.1 |
| 3,220,144 | 11/1965 | Green | 47/38.1 |

FOREIGN PATENTS OR APPLICATIONS

| | | | |
|---|---|---|---|
| 183,168 | 1/1906 | Germany | 47/38.1 |
| 1,581,467 | 8/1969 | France | 47/38.1 |
| 169,387 | 4/1906 | Germany | 47/47 |
| 1,506,410 | 11/1967 | France | 47/47 |
| 141,586 | 8/1953 | Sweden | 47/44 |

*Primary Examiner*—Robert E. Bagwill
*Attorney*—Owen, Wickersham & Erickson

[57] ABSTRACT

A device for supporting a potted plant as well as supplying moisture to it comprises a base member, a tubular member extending upright from it and an upper support member that is removably attached to the tubular member. The base member is adapted to be positioned below the bottom of the pot which is normally located in a water filled vessel. A wick member within the tubular member draws water upwardly through it and passes through sidewall openings to water the surrounding soil.

2 Claims, 3 Drawing Figures

PATENTED JUN 19 1973
3,739,523
FIG_1
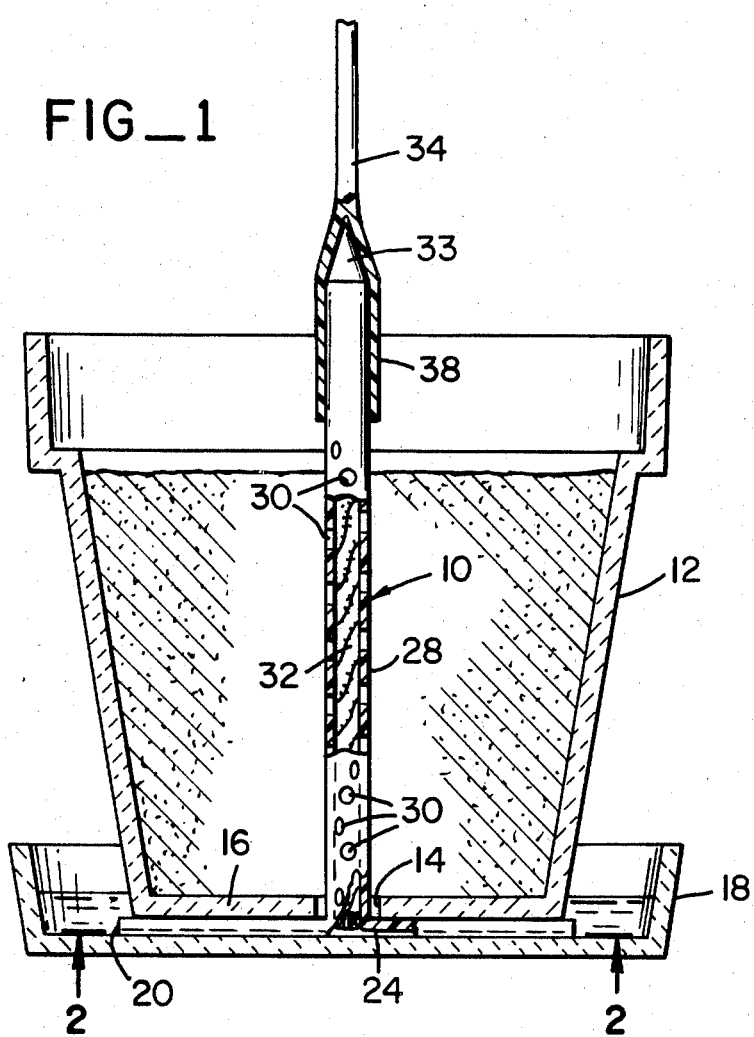
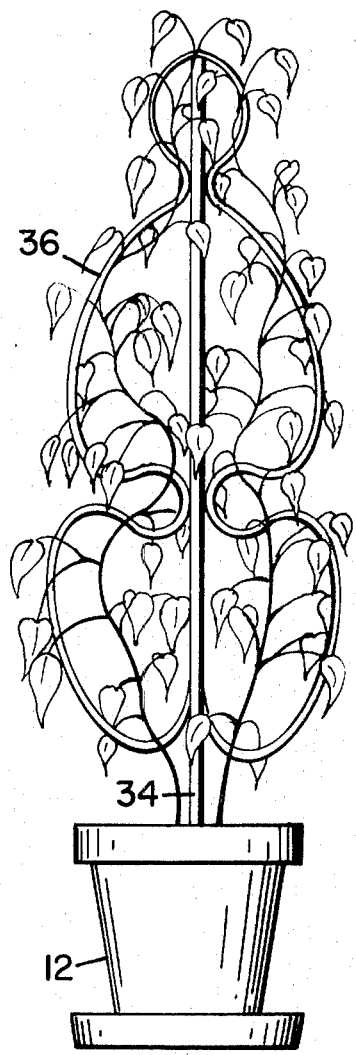
FIG_3
FIG_2
INVENTOR.
JON MARTIN TUFFLI
BY
ATTORNEYS

PLANT HOLDER AND WATERING DEVICE FOR POTTED PLANTS

This invention relates to a device for supporting live plants in small pots and also supplying moisture to them.

Many types of potted plants tend to grow higher than the natural strength of their stalk foliage or root structure will support. Consequently, these plants fall over and break off or must be allowed to extend downwardly over the sides of the pot. This can ruin their appearance as well as affect their growth. Previous attempts to provide supporting stakes buried in the pot were not satisfactory because of the limited depth and softness of the soil in the pot. Moreover, such stakes were usually unsightly and distracted from the natural plant beauty.

Another problem with potted plants was in providing a constant and adequate supply of moisture to the soil within the pot. While hand watering is a simple and most common means of supplying moisture, it does not fulfill the need for sustaining a desirable moisture level between waterings.

One general object of the present invention is to provide a device for use with plants in small pots that will solve the aforesaid problems.

A more specific object of my invention is to provide a strong, rigid, upwardly extending support for plants in a pot that are capable of growing to heights substantially greater than the height of the pot.

Other objects of my invention are to provide a supporting device for potted plants that is easy to install that can be decorative in appearance so as to enhance the beauty of the plant, and also a device which is particularly well adapted for ease and economy of manufacture.

Yet another object of my invention is to provide a supporting device for potted plants that also affords a means for supplying moisture to the soil of the pot.

In general, my device comprises a base member with a central tubular portion that is adapted to extend upwardly through the bottom opening that is normally provided in the bottom of a conventional ceramic flower pot. The tubular portion, surrounded by soil within the pot, extends to a height near its upper edge and slidably connected to it is an upper support member which may have any desired configuration or grille-like design. Within the tubular portion is a wick member of moisture absorbing material that extends from its upper end downwardly to the base member. Water applied to a disc-like vessel that retains the pot and the base member is supplied to the lower end of this wick member and is drawn upwardly by ormosis and is expelled through small openings in the tubular member. Thus, the device when installed, provides both support for the plant and moisture to aid its growth.

Other objects, advantages and features of my invention will become apparent from the following detailed description, presented with the accompanying drawings, in which:

FIG. 1 is view in elevation and in section showing a plant supporting device according to my invention as it appears when installed in a typical pot;

FIG. 2 is a view of my device taken along line 2—2 of FIG. 1; and

FIG. 3 is a reduced view in elevation showing a plant supporting device with a decorative upper portion.

With reference to the drawing, a device 10 is shown in FIG. 1 as it appears when installed in a typical flower pot 12 of the well known type. Such pots are generally made of clay or some other ceramic material and have a central opening 14 in their lower end 16. Usually, the pot is placed in a low sided vessel 18 having a greater diameter than the pot itself.

The device 10 comprises a circular base member 20 that is relatively rigid and has a diameter at least as great as the lower end of the pot, but not as great as the vessel 18. As shown best in FIG. 2, the bottom surface 22 of this base member 20 has a series of radially extending grooves 24 all of which diverge from a central opening 26. Fixed within this opening is a tubular member 28 that extends upwardly at a right angle from the base member. The length of the tubular member is such that it preferably extends to a level substantially at the upper edge of the pot 12. Along its length the tubular member is provided with a plurality of small openings 30 and packed within it is a fibrous material such as an unwoven cotton that forms a wick 32. The latter has the power to draw water upwardly by osmosis when its lower end is in contact with a supply of water or any other liquid. The lower end of the tubular member is attached to the base member so that water within the grooves 24 can readily contact the wick material at its lower end.

The upper end of the tubular member is preferably provided with a pointed or conical cap 33 which enables the member 28 to more easily be pushed upwardly through soil and plant roots in the pot when it is installed.

Slidably attached to the upper end of the tubular member 28 is an upper support member 34. This latter member may be a simple straight rod, as shown in FIG. 3, or it may have outwardly extending grille portions 36 arranged in any suitable decorative shape. The lower end of the upper support member is enlarged to form a sleeve-like portion 38 that fits snugly over the upper end of the tubular member 28 so that the cap 33 fits therein and there is little movement between the two members. The members 28 and 34 therefore act like a single, rigid member when connected as shown in FIG. 1.

The three main elements of my device 10 can be made inexpensively from a rigid plastic material of various well known types or they could also be made of a light metal, if desired. When installed, the connected base and tubular members are first placed in position with the latter extending upwardly through the pot hole 14. If a plant is being initially potted, it can now be placed in the pot with soil being packed around it to the desired depth. Normally, the pot is now installed in the vessel 18 which is at least partially filled with water. When the water contacts the lower end of the wick 32 it works its way upwardly through the tubular member. Along the way the water flows outwardly into the soil through the openings 30 so that the body of soil in the pot is fed with moisture at all levels. The upper plant support is easily attached to the tubular member with its enlarged sleeve portion extending downwardly over its upper end but not covering any of the openings in the wall of the tube. As the plant grows the upper support member can be readily changed to a larger size or to a decorative style of upper support that will support the plant properly and display it most advantageously.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A plant supporting device for use in combination with flower pot of the type having a central opening in its bottom, said device comprising:

a flat, generally planar base member;

a hollow upright member fixed to said base member and extending upwardly at a right angle thereto and adapted to extend through the central opening in the pot, said upright member having a plurality of small openings along its length and a wick member therein;

an upper support member having a coupling means at its lower end engaged with said upright member and an upwardly projecting portion connected to said coupling means and extending well above the upper edge of the pot;

and means on the bottom surface of said base member providing fluid passages that communicate from its periphery with the lower end of said wick member.

2. The plant supporting device as described in claim 1 wherein said upwardly projecting portion of said upper support member has a decorative irregular shaped pattern and said coupling means comprises a lower sleeve portion that fits snugly over the upper end of said upright member.

* * * * *